Patented Aug. 17, 1954

2,686,724

UNITED STATES PATENT OFFICE 2,686,724

STABILIZATION OF EDIBLE FATS AND OILS

Joseph A. Chenicek, Bensenville, Ill., assignor to Universal Oil Products Company, Chicago, Ill., a corporation of Delaware No Drawing. Application August 12, 1949,
Serial No. 110,035

8 Claims. (Cl. 99—163)

This invention relates to the stabilization of edible fats and oils, and more particularly to a method of stabilizing edible fats and oils by incorporating therein an oxidation inhibitor and a novel synergist.

It recently has been discovered that the addition of certain compounds to oxidation inhibitors, when used to stabilize edible fats and oils, prevents or retards rancidity development for a period of time far in excess of that expected on the basis of an additive effect. This phenomenon has been termed "synergism" and compounds which function in this manner are called "synergists."

The oxidation inhibitor to be utilized for the stabilization of edible fats and oils must meet severe requirements. The inhibitor must function to prevent or retard the development of rancidity in edible fats and oils. The inhibitor must be non-toxic so that it may be used safely without fear of possible poisoning. The inhibitor must not impart a bad odor, taste or color to the fats and oils. The inhibitor must be readily soluble in fats ond oils and further should not be removed therefrom during cooking or in deep fat frying due to its volatility or heat unstability. Another important property desired in the inhibitor is that it carries over into the bakery products. Many bakery products, such as crackers, potato chips, popcorn, etc., are kept for considerable periods of time in factories, stores or in the homes before consumption. These bakery goods tend to become rancid during these long periods of storage.

A number of oxidation inhibitors meet the requirements hereinbefore set forth in varying degrees. A particularly preferred inhibitor comprises a 2-alkyl-4-alkoxyphenol and still more particularly 2-tert-butyl-4-methoxyphenol and 2-tert-butyl-4-ethoxyphenol. Other preferred inhibitors include N. D. G. A. (nordihydroguaiaretic acid), gum guaiac and tocopherol. Still other preferred inhibitors include 1-hydroxy-4-ethoxy-7-methyl-5,8-dihydronaphthalene, 1,5-diphenyl-1,5-diethylthiopentanone-3, 1,7-dihydroxynaphthalene, 2,2-dimethyl-6-tert-butyl-5-hydroxycoumaran and related compounds. Other oxidation inhibitors include trialkyl phenols, alkyl catechols, propyl gallate and lauryl thiodipropionate. It is understood, however, that the novel features of the present invention are applicable to any oxidation inhibitor which is suitable for use in edible fats and oils.

The edible fats and oils to which the present invention is directed include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as the hydrogenated oils and fats. It is understood that other oils and fats may be treated within the scope of the present invention, including oils and fats which have previously been subjected to various treatments such as blowing with air, heat treatment, etc.

The synergist of the present invention may also find utility in the treatment of crops by dusting or spraying in order to preserve food accessory factors such as carotene, vitamins, various fatty acids, alcohols, etc. The synergist along with the oxidation inhibitor will penetrate through the leaves of the plants or form a protective coating and, thereby, will serve to stabilize the plant oils.

In a broad embodiment the present invention relates to a process for stabilizing edible fats and oils which comprises incorporating therein an oxidation inhibitor and a synergist comprising a disubstituted - aminomethyl - hydroxyaromatic compound.

In a specific embodiment the present invention relates to a process for stabilizing edible fats and oils against rancidity which comprises incorporating therein from about 0.001% to about 0.5% of an oxidation inhibitor and from about 0.001% to about 0.3% of a synergist comprising a dialkylaminomethyl-dihydroxybenzene.

In another specific embodiment the present invention relates to a method of stabilizing edible fats and oils against rancidity which comprises incorporating therein an oxidation inhibitor and a synergist comprising a dialkylamino-methyl-4-alkoxyphenol.

In another specific embodiment the present invention relates to a method of stabilizing lard against rancidity which comprises incorporating therein from about 0.001% to about 0.5% by weight of N. D. G. A. and from about 0.001% to about 0.3% by weight of 2,5-bis-dimethylaminomethylhydroquinone.

In still another embodiment the present invention relates to a novel composition of matter comprising an edible fat and oil, an oxidation inhibitor and a synergist as herein set forth.

In a broad aspect the synergist of the present invention may illustrated by the following general formula:

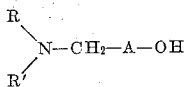

where R and R' are alkyl or cycloalkyl radicals which may also be substituted or where R and R' are carbon atoms of a heterocyclic ring, where A is an arylene group which may contain hydrocarbon or other substituent groups, and N is nitrogen. In general, the preferred compounds contain the hydroxyl and disubstituted aminomethyl groups on adjacent carbon atoms.

Where the synergist comprises a derivative of monohydroxybenzene, the synergist may be illustrated by the following general formula:

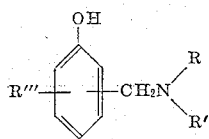

where N, R and R' are the same as hereinbefore specified and R''' is hydrogen, a disubstituted aminomethyl radical, alkyl, aralkyl, aryl or alkaryl radical.

The preferred synergists of the present invention comprise those derived from dihydroxybenzene and may be illustrated in the following general formula:

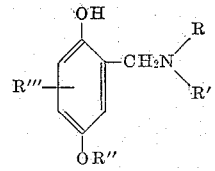

where R and R' are alkyl or cycloalkyl radicals which may also be substituted or where R and R' are carbon atoms of a heterocyclic ring, R'' is hydrogen, alkyl, aralkyl, aryl or alkaryl radical, and R''' is a disubstituted aminomethyl radical, hydrogen, alkyl, aralkyl, aryl or alkaryl radical.

Where R and R' are alkyl or substituted alkyl radicals and R'' is hydrogen, suitable compounds include 2-dimethylaminomethylhydroquinone, 2-diethylaminomethylhydroquinone, 2 - dipropylaminomethylhydroquinone, 2 - dibutylaminomethylhydroquinone, 2 - diamylaminomethylhydroquinone, 2-di-β-hydroxyethylaminomethylhydroquinone, etc. Derivatives in which R'' is an alkyl or substituted alkyl radical include such compounds as 2-dimethylaminomethyl-4-methoxyphenol, 2 - diethylaminomethyl - 4 - methoxyphenol, 2-dipropylaminomethyl-4-methoxyphenol, 2-diamylaminomethyl-4-methoxyphenol, 2-dimethylaminomethyl-4-ethoxyphenol, 2-diethylaminomethyl-4-ethoxyphenol, 2-dipropylamino methyl-4-ethoxyphenol, 2-dibutylaminomethyl-4-ethoxyphenol, 2-diamylaminomethyl-4-ethoxyphenol, 2-dimethylaminomethyl-4-propoxyphenol, 2-diethylaminomethyl-4-propoxyphenol, 2-dipropylaminomethyl - 4 - propoxyphenol, 2-dibutylaminomethyl-4-propoxyphenol, 2-dimethylaminomethyl - 4 - butoxyphenol, 2-diethylaminomethyl-4-butoxyphenol, 2-dipropylaminomethyl-4-butoxyphenol, 2 - dibutylaminomethyl - 4-butoxyphenol, 2-di-β-hydroxyethylaminomethyl-4-methoxyphenol, etc. Other suitable compounds of a hydroquinone or 4-alkoxyphenol type include those in which R and R' are cycloalkyl radicals as illustrated by 2-dicyclohexylaminomethylhydroquinone and 2-dicyclohexylaminomethyl-4-alkoxyphenols. Here again the alkoxy group may comprise ethoxy, methoxy, propoxy, butoxy, pentoxy, etc. radicals.

Also included within the scope of the present invention are compounds in which R and R' are different. Representative compounds of this category include hydroquinone or 4-alkoxyphenols substituted in the 2-position by radicals such as methylethyl-aminomethyl, methylpropyl-aminomethyl, methylbutyl-aminomethyl, methylamyl - aminomethyl, ethylpropyl - aminomethyl, ethylbutyl - aminomethyl, ethylamyl - aminomethyl, propylbutyl-aminomethyl, propylamyl-aminomethyl, butylamyl-aminomethyl, etc. and radicals in which R is an alkyl group and R' is a cycloalkyl group as in such radicals as methylcyclohexylaminomethyl and ethylcyclohexylaminomethyl.

Another class of compounds within the scope of the present invention include those in which R and R' are carbon atoms of a heterocyclic ring. Heterocyclic rings include those derived from morpholine, piperazine, piperidine and pyrrolidine.

Referring again to the structural formula heretofore set forth, when R''' comprises a disubstituted-aminomethyl radical, it generally will be the same as the group attached in the 2-position. Suitable compounds include 2,5-bis-(dimethylaminomethyl)-hydroquinone, 2,5-bis-(morpholinomethyl)-4-hydroxyphenol, etc. and particularly 2,5 - bis - (diethylaminomethyl) - hydroquinone.

It is understood that the compounds specifically set forth herein are merely typical representatives of the class of compounds which may be used in accordance with the broad scope of the present invention and that the various compounds are not necessarily of equivalent synergistic potency in the various edible fats and oils and with the different oxidation inhibitors. In general, it is preferred that the total number of carbon atoms in the synergist is not greater than about 25, as it has been found that, within certain limits, the potency of the synergist decreases with inclusion of hydrocarbon radicals of high molecular weight.

Many edible fats and oils and particularly certain vegetable oils contain compounds which have an oxidation inhibitor effect and these compounds are generally referred to as natural inhibitors. In some cases, the addition of a synergist in the manner set forth herein will result in a product which is stabilized sufficiently for all practical purposes without the necessity of employing added oxidation inhibitors. The use of a synergist in connection with these natural inhibitors is also comprised within the scope of the present invention. It is also understood that the synergist of the present invention may be used along with two or more added oxidation inhibitors but, in general, it appears that the synergistic effect of the present invention is greatest when used with a single inhibitor.

While the present invention is directed specifically to edible fats and oils, there are a number of greases and lubricating oils utilized in machines for cutting, storing, pressing or other handling of foods. Where there is a possibility of the grease or oil coming into contact with the food or food product, it is desirable that the grease or lubricating oil be non-toxic, and also that any compounds added thereto likewise be non-toxic. The application of an oxidation inhibitor and the synergist as herein set forth to such greases and oils is comprised within the scope of the present invention.

The synergist and oxidation inhibitor may be added to edible fats and oils in any suitable manner, including forming a mixture of synergist and inhibitor and then adding the mixture to the fats and oils, or else adding the synergist and inhibitor separately to the fats and oils. If either the inhibitor or synergist is a solid at room temperature, it or they may be added as a powder and thoroughly mixed in the edible fats and oils, but preferably may be heated to a moderate temperature at which it or they become fluid and then added as a liquid to the fats and oils.

In general the amount of synergist employed will be less than the amount of oxidation inhibitor used. The amount of oxidation inhibitor usually will be less than 1% and more commonly within the range of from about 0.001% to about 0.5% by weight of the fats and oils, and the synergist will generally be less than 0.5% and more specifically within the range of about 0.001% to about 0.3% by weight of the fats and oils.

The following examples are introduced to illustrate further the novelty and utility of the present invention, but not with the intention of unduly limiting the same.

The lard utilized in these tests had a stability period of 3 hours as determined by the Swift test. This test is described in detail in the article by A. E. King, H. L. Roschen and W. H. Irwin, which appeared in Oil and Soap, volume X, No. 6, pages 105 to 109 (1933). In general, this test comprises bubbling air through a sample of the lard until rancidity is determined organoleptically or by peroxide values.

2,5 - bis - (diethylaminomethyl) - hydroquinone was prepared as follows: hydroquinone and diethylamine were placed in a 3-necked flask fitted with a stirrer, thermometer and dropping funnel. A 35% formaldehyde-aqueous solution was added dropwise to the mixture, while the mixture was being stirred and maintained at a temperature of 20–30° C. The reaction product was extracted with ether, dried, the ether evaporated, and the residue crystallized from methyl alcohol.

As will be shown in the following examples, various oxidation inhibitors were utilized. The oxidation inhibitor and the synergist were each used in an amount of 0.004% by weight of the lard. The stability of the lard without any additive, with only the oxidation inhibitor and with the mixture of both the oxidation inhibitor and the synergist is shown in the following table. In addition, the calculated increase expected by the addition of both the oxidation inhibitor and the synergist is shown, as well as the unexpected increase obtained over and above that expected from the sum total effect of each additive.

Table

| Additive (0.004% of each) | Stability (Hrs.) | Increase In Stability (Hrs.) | Calculated Increase | Unexpected Increase |
|---|---|---|---|---|
| Lard | 3 | | | |
| Lard+2,5-bis-dimethyl-amino-hydroquinone | 11 | 8 | | |
| Lard+1-hydroxy-4-ethoxy-7-methyl-5,8-dihydronaphthalene | 20 | 17 | | |
| Lard+1,5-diphenyl-1,5-diethyl-thiopentanone-3 | 10 | 7 | | |
| Lard-NDGA | 20 | 17 | | |
| 1,7-dihydroxynaphthalene | 56 | 53 | | |
| 2-tert-butyl-4-methoxyphenol | 11 | 8 | | |
| 2,2-dimethyl-6-tert-butyl-5-hydroxycoumaran | 29 | 26 | | |
| Propyl gallate | 10 | 7 | | |
| Lard+1-hydroxy-4-ethoxy-7-methyl-5,8-dihydronaphthalene+2,5-bis-dimethylaminomethylhydroquinone | 48 | 45 | 25 | 20 |
| Lard+1,5-diphenyl-1,5-diethyl-thiopentanone-3+2,5-bis-dimethylaminomethylhydroquinone | 48 | 45 | 15 | 30 |
| Lard+NDGA+2,5-bis-dimethylaminomethylhydroquinone | 60 | 57 | 25 | 32 |
| Lard+1,7-dihydroxynaphthalene+2,5-bis-dimethylamino methylhydroquinone | 80 | 77 | 61 | 16 |
| Lard+2-tert-butyl-4-methoxyphenol+2,5-bis-dimethylaminomethylhydroquinone | 27 | 24 | 16 | 8 |
| Lard+2,2-dimethyl-6-tert-butyl-5-hydroxycoumaran+2,5-bis-dimethyl-aminomethylhydroquinone | 46 | 43 | 34 | 9 |
| Lard+propyl gallate+2,5-bis-dimethylaminomethylhydroquinone | 30 | 27 | 15 | 12 |

It will be noted that 2,5-bis-dimethylaminomethylhydroquinone when added to the various oxidation inhibitors resulted in an unexpected increase varying from 9 hours to 32 hours over and above that expected from the sum total of the additive effects of the oxidation inhibitor and the synergist.

I claim as my invention:

1. A process for stabilizing edible fats and oils which comprises incorporating therein from about 0.001% to about 0.3% by weight of a disubstituted-aminomethyl-dihydroxybenzene and from about 0.001% to about 0.5% by weight of an oxidation inhibitor selected from the group consisting of 1-hydroxy-4-ethoxy-7-methyl-5,8-dihydronaphthalene, 1,5-diphenyl-1,5-diethyl-thiopentanone-3, nordihydroguaiaretic acid, 1,7-dihydroxynaphthalene, 2-tert-butyl-4-methoxyphenol, 2,2-dimethyl-6-tert-butyl-5-hydroxycoumaran and propyl gallate.

2. A process for stabilizing edible fats and oils against rancidity which comprises incorporating therein from about 0.001% to about 0.3% by weight of a dialkylaminomethyl-dihydroxybenzene and from about 0.001% to about 0.5% by weight of an oxidation inhibitor selected from the group consisting of 1-hydroxy-4-ethoxy-7-methyl-5,8-dihydronaphthalene, 1,5-diphenyl-1,5-diethyl-thiopentanone-3, nordihydroguaiaretic acid, 1,7-dihydroxynaphthalene, 2-tert-butyl-4-methoxyphenol, 2,2-dimethyl-6-tert-butyl-5-hydroxycoumaran and propyl gallate.

3. A process for stabilizing edible fats and oils against rancidity which comprises incorporating therein from about 0.001% to about 0.3% by weight of a 2,5-bis-dialkylaminomethylhydroquinone and from about 0.001% to about 0.5% by weight of an oxidation inhibitor selected from the group consisting of 1-hydroxy-4-ethoxy-7-methyl-5,8-dihydronaphthalene, 1,5-diphenyl-1,5-diethyl-thiopentanone-3, nordihydroguaiaretic acid, 1,7-dihydroxynaphthalene, 2-tert-butyl-4-methoxyphenol, 2,2-dimethyl-6-tert-butyl-5-hydroxycoumaran and propyl gallate.

4. A process for stabilizing lard against rancidity which comprises incorporating therein from about 0.001% to about 0.3% by weight of 2,5-bis-dimethylaminomethyl-hydroquinone and from about 0.001% to about 0.5% by weight of an oxidation inhibitor selected from the group consisting of 1-hydroxy-4-ethoxy-7-methyl-5,8-dihydronaphthalene, 1,5-diphenyl-1,5-diethyl-thiopentanone-3, nordihydroguaiaretic acid, 1,7-dihydroxynaphthalene, 2-tert-butyl-4-methoxyphenol, 2,2-dimethyl-6-tert-butyl-5-hydroxycoumaran and propyl gallate.

5. Edible fats and oils normally tending to become rancid having incorporated therein from about 0.001% to about 0.3% by weight of a disubstituted-aminomethyl-dihydroxybenzene and from about 0.001% to about 0.5% by weight of an oxidation inhibitor selected from the group consisting of 1-hydroxy-4-ethoxy-7-methyl-5,8-dihydronaphthalene, 1,5-diphenyl-1,5-diethyl-thiopentanone-3, nordihydroguaiaretic acid, 1,7-dihydroxynaphthalene, 2-tert-butyl-4-methoxyphenol, 2,2-dimethyl-6-tert-butyl-5-hydroxycoumaran and propyl gallate.

6. Edible fats and oils stabilized against rancidity containing from about 0.001% to about 0.3% by weight of a dialkylaminomethyldihydroxybenzene and from about 0.001% to about 0.5% by weight of an oxidation inhibitor selected from the group consisting of 1-hydroxy-4-ethoxy-7-methyl-5,8-dihydronaphthalene, 1,5-diphenyl-1,5-diethyl-thiopentanone-3, nordihydroguaiaretic acid, 1,7-dihydroxynaphthalene, 2-tert-butyl-4-methoxyphenol, 2,2-dimethyl-6-tert-butyl-5-hydroxycoumaran and propyl gallate.

7. Edible fats and oils stabilized against rancidity containing from about 0.001% to about 0.3% by weight of a 2,5-bis-dialkylaminomethyl-hydroquinone and from about 0.001% to about 0.5% by weight of an oxidation inhibitor selected from the group consisting of 1-hydroxy-4-ethoxy-7-methyl-5,8-dihydronaphthalene, 1,5-diphenyl-1,5-diethyl-thiopentanone-3, nordihydroguaiaretic acid, 1,7-dihydroxynaphthalene, 2-tert-butyl-4-methoxyphenol, 2,2-dimethyl-6-tert-butyl-5-hydroxycoumaran and propyl gallate.

8. Lard stabilized against rancidity containing from about 0.001% to about 0.3% by weight of 2,5-bis-dimethylaminomethyl-hydroquinone and from about 0.001% to about 0.5% by weight of an oxidation inhibitor selected from the group consisting of 1-hydroxy-4-ethoxy-7-methyl-5,8-dihydronaphthalene, 1,5-diphenyl-1,5-diethyl-thiopentanone-3, nordihydroguaiaretic acid, 1,7-dihydroxynaphthalene, 2-tert-butyl-4-methoxyphenol, 2,2-dimethyl-6-tert-butyl-5-hydroxycoumaran and propyl gallate.

References Cited in the file of this patent

UNITED STATES PATENTS

| Number | Name | Date |
| --- | --- | --- |
| 2,050,689 | Briod | Aug. 11, 1936 |
| 2,181,121 | Downing | Nov. 28, 1939 |
| 2,181,122 | Downing | Nov. 28, 1939 |
| 2,518,577 | Thompson et al. | Aug. 15, 1950 |
| 2,553,441 | Chenicek | May 15, 1951 |

OTHER REFERENCES

Lundberg-Hormel Inst. of U. of Minn., August 1947, pp. 17–19.